E. T. MEAKIN.
NON-SKIDDING DEVICE.
APPLICATION FILED DEC. 14, 1915. RENEWED JAN. 26, 1918.

1,277,333.

Patented Aug. 27, 1918.
3 SHEETS—SHEET 1.

Witnesses
H. P. Harwood

Inventor
Edgar T. Meakin.
By
A. T. Ware
Attorney

E. T. MEAKIN.
NON-SKIDDING DEVICE.
APPLICATION FILED DEC. 14, 1915. RENEWED JAN. 26, 1918.
1,277,333.
Patented Aug. 27, 1918.
3 SHEETS—SHEET 2.
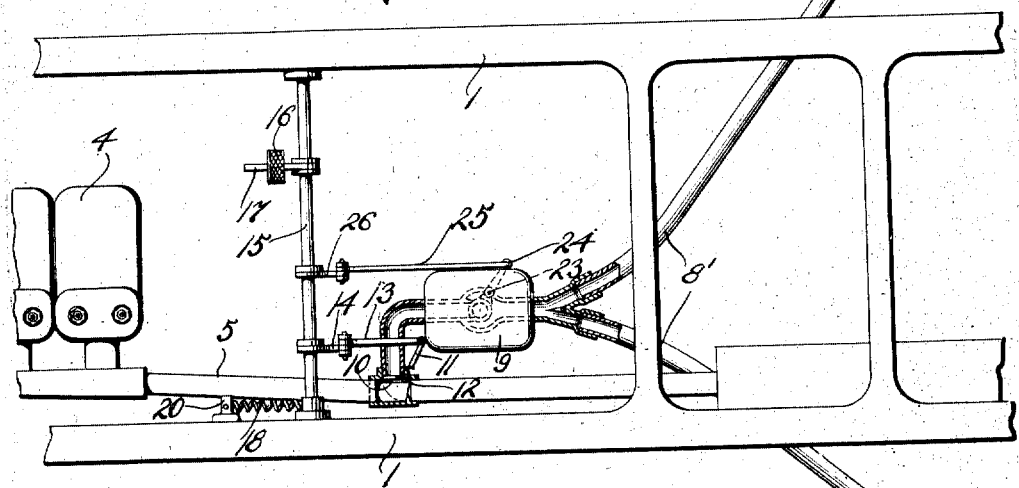
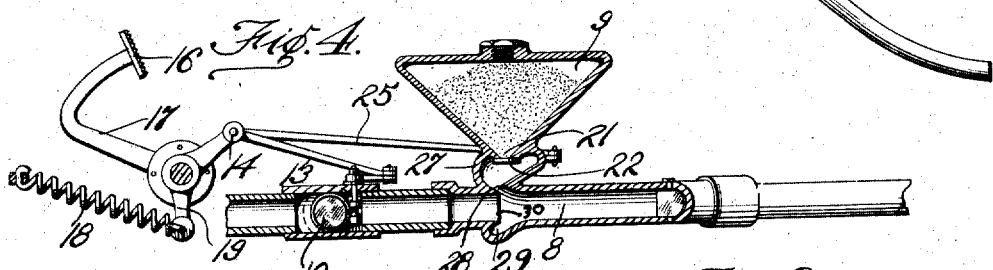
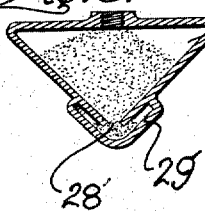
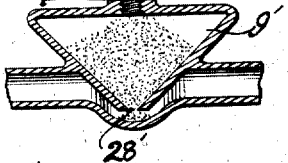
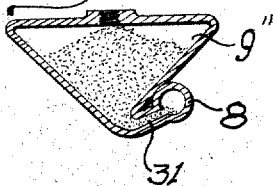
WITNESSES
H. P. Harwood.
INVENTOR
Edgar T. Meakin,
BY
A. S. Pari
ATTORNEY

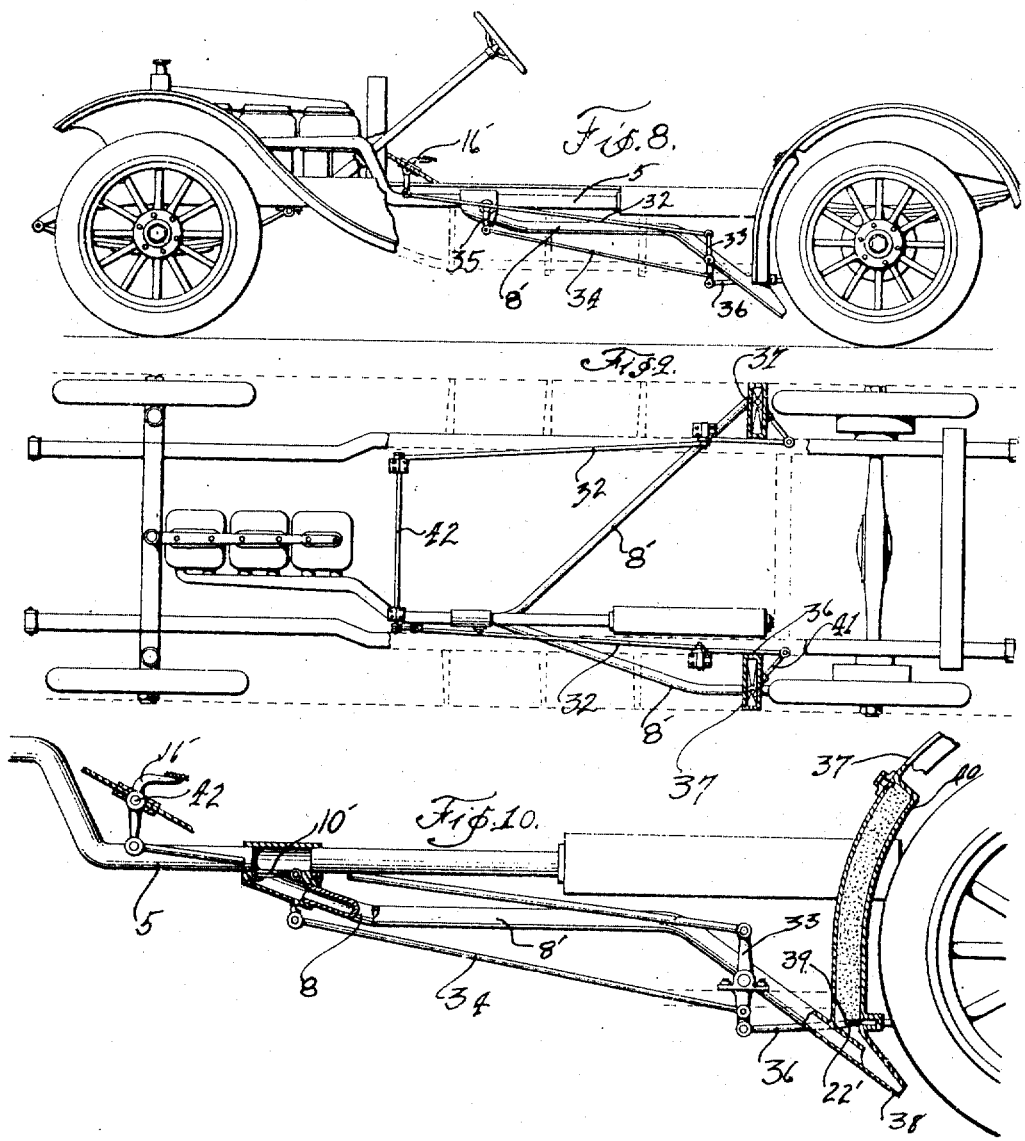

UNITED STATES PATENT OFFICE.

EDGAR T. MEAKIN, OF BERKELEY, CALIFORNIA.

NON-SKIDDING DEVICE.

1,277,333.     Specification of Letters Patent.     Patented Aug. 27, 1918.

Application filed December 14, 1915, Serial No. 66,682. Renewed January 26, 1918. Serial No. 214,032.

*To all whom it may concern:*

Be it known that I, EDGAR T. MEAKIN, residing in Berkeley, county of Alameda, State of California, have invented certain new and useful Improvements in Non-Skidding Devices, whereof the following is a specification.

My invention relates to means for preventing skidding of automobile wheels and has at its principal object the prevention of skidding by delivering sand beneath the wheels of automobiles.

A second object of my invention is to so deliver the sand beneath the wheels of the automobile that the same will be effective even in windy weather.

A final object of my invention resides in the particular arrangement and combination of parts hereinafter described.

In the accompanying drawings:—

Fig. 3 is a plan view on an enlarged scale of a portion of Fig. 1.

Fig. 4 is a detail view taken on an irregular section line and at a plane at right angles to Fig. 3.

Figs. 5, 6 and 7 are detail sectional views showing two modified forms of sand box with connections to the blast pipe.

Figs. 8 and 9 are side and plan views respectively of a modified arrangement, and Fig. 10, is an enlarged detail of the important parts of Fig. 8, parts being broken away.

Throughout the separate figures the same part is designated by the same reference character.

Figure 1:
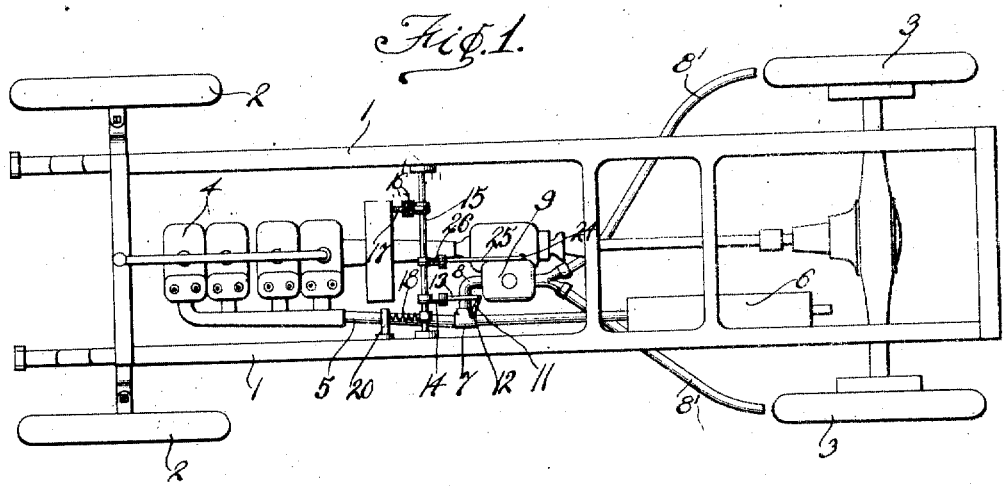
Figure 1 is a plan view of an automobile which has been fitted with my invention, the body of the automobile having been removed.
Figure 2:
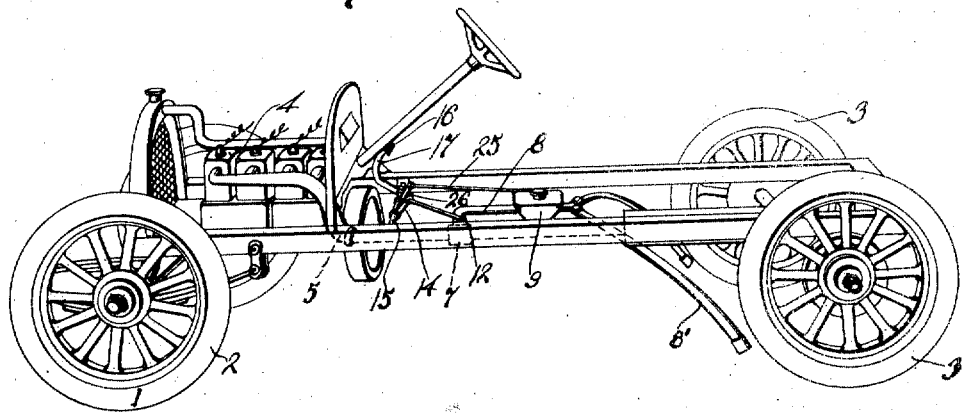
Fig. 2 is a perspective view of the automobile as shown in Fig. 1.

Referring more particularly to the drawings, 1 designates the chassis of an automobile having the front wheels such as 2 and the rear wheels such as 3. 4 designates the engine of the automobile, the exhaust pipe for which is shown at 5, the exhaust normally discharging through the usual muffler such as 6.

Now at 7 I provide a T connection in the exhaust pipe from which I lead off a by-pass 8, the pipe 8 passing beneath the sand-box 9 and thereafter dividing into the two branches 8'—8' which I show as running rearwardly and downwardly so as to discharge beneath the driving wheels 3.

The exhaust gases coming from the engine are normally prevented from entering the by-pass 8 by a valve 10 which is normally held over the mouth of the pipe 8 as clearly shown in Fig. 3, but which may be turned to the position indicated in dotted lines in Fig. 3, in the latter position the valve 10 serving to divert the exhaust gases into the pipe 8 and to cut off the further passage of gases to the muffler. The valve 10 has a lever 11 fixed thereto, the valve and lever being pivoted at the point 12 and I provide a link 13 which is connected with the lever 11 at one end and at the other end with an arm 14 fixed on the shaft 15. The shaft 15 may be turned in one direction to move the valve 10 by means of a foot pedal 16 carried by an arm 17 fixed to the shaft 15, previously mentioned. The shaft is, however, normally held in such position that the valve closes the by-pass 8 as previously mentioned and for this purpose I provide a spring 18 fixed at one end to an arm 19, the arm 19 being fixed to the shaft, while the other end of the spring 18 is secured to the fixed rod or bar 20 rigid with the chassis.

Now the sand-box 9 is provided with an inclined bottom which slopes down on all sides to an opening 21 at the extreme lower end of said box. The outlet 21 is normally closed by a horizontal valve 22 mounted to turn about a vertical pivot 23, and having rigid therewith an arm 24. The arm 24 is connected by a link 25 to a lever or arm 26 and the shaft 15, previously mentioned, so that the valve 22 is opened each time the by-pass valve 10 is also opened. As shown in the preferred form in Figs. 3 and 4, the valve 22 is mounted within a small delivery chamber 27, the mouth 28 of which is inclined in the direction of flow of the exhaust gases through the by-pass 8 in order to facilitate the slipping off of the sand particles by the stream of exhaust gases. The pipe 8, moreover, is enlarged somewhat immediately beneath the mouth 28 as indicated at 29, the pipe 8 projecting into enlargement 29 as shown at 30, so as to give an aspirating effect.

Instead of the arrangement shown in Fig. 4 I may dispense with the valve 22 and accompanying features and allow the sand to enter the pipe 8 directly as shown in Figs. 5, 6 and 7. In Figs. 5 and 6 the lower end of the sand box 9' extends into an enlargement 29' in the pipe 8, the opening 28' in the bottom of the box 9' being close to the bottom of the enlargement 29' so that a small pile of sand always stands below the opening 28'. However, there is always a passage for the exhaust gases at each side of the pile of sand so that the gases may carry the sand away. In Fig. 7 the sand box 9'' is set at one side of the pipe 8 and connected thereto by a short upwardly inclined neck 31, the sand at the mouth of the neck being exposed to the gases in the pipe 8.

Referring more particularly to Figs. 8, 9 and 10, 16' is a foot operated lever connected by a link 32 with a pivoted arm 33 at the top of said arm. From the lower end of arm 33 extends a link 34 which runs back in the direction of the link 32 and connects with an arm 35 which is adapted to turn the valve 10' so as to open the mouth of the by-pass 8, at the same time partly closing the pipe 5 and forcing gases into the pipe 8 in a manner similar to the action of the valve 10, the valve 10' however lifting from the bottom of the pipe 5. The pipe 8 branches into the parts 8' in the modified form as in the first mentioned form, but in the modified form the mud guards 37 carry sand boxes 40, the lower ends of which are closed by valves 22', a rib 39 closing a portion of the lower end of the box 40. A link 36 connects also with the lower end of the arm 33 and operates the valve 22' by means of a pivoted arm 41 shown in Fig. 9 so that the lower end of each sand box 40 is opened at the same time that the valve 10' is raised.

Sand from each box 40 drops into a nozzle 38 which incloses the end of the pipe 8' and which is placed close to the drive wheel so as to deliver the sand thereto.

Having thus described my invention, I claim:—

1. The combination with a vehicle, a gas engine for driving the same, an exhaust pipe for said engine, a by-pass leading from said exhaust pipe, a sand-box adapted to deliver into said by-pass, said by-pass being adapted to deliver sand from said box beneath the wheels, and a valve normally closing said by-pass to prevent passage of gases therethrough, said valve progressively obstructing the exhaust pipe as it opens the by-pass.

2. The combination with a vehicle, a gas engine for driving the same, an exhaust pipe for said engine, a by-pass leading from said exhaust pipe, a sand-box adapted to deliver into said by-pass, said by-pass being adapted to deliver sand from said box beneath the wheels, a valve normally closing said by-pass to prevent passage of gases therethrough, and a valve normally closing said sand box.

3. The combination with a vehicle, a gas engine for driving the same, an exhaust pipe for said engine, a by-pass leading from said exhaust pipe, a sand box adapted to deliver into said by-pass, said by-pass being adapted to deliver sand from said box beneath the wheels, a valve normally closing said by-pass to prevent passage of gases therethrough, a valve normally closing said sand box, and means for simultaneously opening said valves when desired.

4. The combination with a vehicle, a gas engine for driving the same, an exhaust pipe for said engine, a by-pass leading from said exhaust pipe, a sand box opening into said by-pass, and a valve normally closing said by-pass, said by-pass delivering sand to the driving wheels when the said valve is open, said valve obstructing the exhaust pipe beyond the by-pass when the by-pass is open.

5. The combination with a vehicle, a gas engine for driving the same, an exhaust pipe for said engine, a by-pass leading from said exhaust pipe, a sand box connected to said by-pass, a valve normally closing said by-pass to prevent the passage of gases therethrough, a chamber between said sand box and said by-pass, a valve for holding the sand in said box mounted in said chamber, said by-pass having an aspirator formed therein at the mouth of said chamber, said by-pass delivering sand to the drive wheels when the valve is open, and means for operating said valves simultaneously.

6. The combination with a vehicle, a gas engine for driving the same, an exhaust pipe for said engine, a by-pass leading from said exhaust pipe, a sand box connected to deliver into said by-pass, and a swinging valve normally closing the inlet to said by-pass, said valve progressively obstructing the passage of gas in the exhaust pipe beyond the mouth of the by-pass as it turns to open the by-pass, said by-pass delivering sand to the drive wheels when said valve is open.

7. The combination with a vehicle, a gas engine for driving the same, an exhaust pipe for said engine, a by-pass leading from said exhaust pipe, a sand box connected to deliver into said by-pass, and a valve normally closing the inlet to said by-pass, said valve being adapted to obstruct the passage of gas in the exhaust pipe beyond the mouth of the by-pass as it turns to open the by-pass, said by-pass delivering sand to the drive wheels when said valve is open, said sand box being mounted on the mud guard of the vehicle.

In testimony that I claim the foregoing I have hereto set my hand in the presence of witnesses, this 8th day of December, 1915.

EDGAR T. MEAKIN.

Witnesses:
 GRACE PARÉ,
 L. A. ALVES.